US012606772B1

(12) United States Patent
Nana et al.

(10) Patent No.: US 12,606,772 B1
(45) Date of Patent: Apr. 21, 2026

(54) PURIFICATION OF CONTAMINATED FEEDSTOCKS VIA HYDROLYSIS AND ACIDULATION

(71) Applicant: Applied Research Associates, Inc., Albuquerque, NM (US)

(72) Inventors: Sanjay Nana, Panama City, FL (US); Jocelyn Marie Goodwin, Panama City, FL (US); Edward N. Coppola, Panama City, FL (US); Charles Red, Jr., Youngstown, FL (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

(21) Appl. No.: 19/076,527

(22) Filed: Mar. 11, 2025

(51) Int. Cl.

| | |
|---|---|
| ***C11B 3/04*** | (2006.01) |
| ***C11B 3/00*** | (2006.01) |
| ***C11B 13/00*** | (2006.01) |
| ***C11C 1/04*** | (2006.01) |

(52) U.S. Cl.
CPC ................ *C11B 3/04* (2013.01); *C11B 3/001* (2013.01); *C11B 3/008* (2013.01); *C11B 13/00* (2013.01); *C11C 1/04* (2013.01)

(58) Field of Classification Search
CPC ............ C11B 3/001; C11B 3/04; C11B 13/00
See application file for complete search history.

(56) References Cited

U.S. PATENT DOCUMENTS

| | | | | |
|---|---|---|---|---|
| 10,071,322 | B2 * | 9/2018 | Coppola | C10G 31/06 |
| 11,781,075 | B2 * | 10/2023 | Coppola | C11B 3/04 208/252 |
| 2012/0190872 | A1 | 7/2012 | Cranford et al. | |
| 2016/0214028 | A1 | 7/2016 | Coppola et al. | |
| 2020/0224121 | A1 | 7/2020 | Long et al. | |
| 2024/0400909 | A1 * | 12/2024 | Floan | C10G 53/04 |

OTHER PUBLICATIONS

PCT Patent Application PCT/US2025/19336 International Search Report and Written Opinion of the International Searching Authority issued Sep. 8, 2025.

* cited by examiner

*Primary Examiner* — Yate' K Cutliff
(74) *Attorney, Agent, or Firm* — Erise IP, P.A.

(57) ABSTRACT

Systems, methods, and devices for decontaminating a contaminated feedstock. Water is mixed with the contaminated feedstock and fed to a reactor to hydrolyze contaminants from the contaminated feedstock. After hydrolyzing contaminants, acid is then added to the mixture of water and feedstock to acidulate contaminants. Acidulating contaminants after hydrolyzing contaminants reduces or prevents the formation of foulants. The hydrolysis and acidulation of contaminants reduces the concentration of contaminants within the contaminated feedstock to produce a clean feedstock.

15 Claims, 4 Drawing Sheets

PURIFICATION OF CONTAMINATED FEEDSTOCKS VIA HYDROLYSIS AND ACIDULATION

BACKGROUND

1. Field

Embodiments of the present disclosure generally relate to the decontamination of contaminated fats, oils, and greases. More specifically, embodiments of the present disclosure relate to a process that utilizes water, acid, temperature, pressure, and turbulent flow to cause hydrolysis of phospholipids and acidulation of metal soaps to decontaminate contaminated fats, oils, and greases.

2. Related Art

Current techniques for decontaminating renewable feedstocks include adding acid and water to a contaminated feedstock to form a mixture, pressurizing and heating the mixture, and feeding the mixture to a reactor. However, current techniques for decontaminating feedstocks cause foulants to form and deposit in the process units, such as the heat exchangers. The formation and deposition of foulants cause a loss of heat transfer, an increased pressure differential across the process units, such as the heat exchangers, and blockages in the process units, such as the heat exchanger components. For example, the formation and deposition of foulants leads to the heat exchangers being unable to provide sufficient heating to the mixture, requiring frequent flushing or mechanical cleaning of the heat exchangers. Current techniques lack a process for decontaminating contaminated feedstocks that does not form foulants that deposit in the process units, such as heat exchangers.

SUMMARY

Embodiments of the present disclosure solve the above-mentioned problems by providing systems and methods for decontaminating contaminated feedstocks, for example comprising phospholipids and metal soaps. In particular, embodiments of the present disclosure concern a process to cause hydrolysis of phospholipids to reduce contaminants within a contaminated feedstock without excess fouling in the process devices, particularly in the heat exchangers. Further, embodiments of the present disclosure include adding acid to the contaminated feedstock after hydrolyzing the phospholipids to cause acidulation of metal soaps so that the resulting metal salts produced by the acidulation reaction can be removed from the contaminated feedstock. Accordingly, embodiments of the present disclosure reduce or prevent the formation of foulants and thereby extend the time between cleaning of the process units, such as the heat exchangers, in the system.

In some embodiments, the techniques described herein relate to a process for reducing contaminants in a contaminated feedstock, the process including: forming a mixture by adding water to the contaminated feedstock, wherein the contaminated feedstock contains organic contaminants such as phospholipids and/or metal soaps; feeding the mixture into a reactor at a first temperature, a first pressure, and turbulent flow; maintaining the first temperature, the first pressure, and the turbulent flow for a residence time to hydrolyze the phospholipids producing glycerides and to produce a reactor effluent, wherein the glycerides partition into an organic phase of the reactor effluent and phosphate salts partition into an aqueous phase of the reactor effluent; reducing a temperature of the reactor effluent to a second temperature via a heat exchanger; adding acid to the effluent to form an acid-effluent mixture and to acidulate the metal soaps and produce fatty acids that partition into the organic phase; and metal salts that partition into the aqueous phase; and separating the acid-effluent mixture into a purified feedstock including the matter of the organic phase of the reactor effluent and a wastewater stream including the matter of the aqueous phase of the reactor effluent.

In some embodiments, the techniques described herein relate to a process, wherein the contaminated feedstock includes at least one of oils, plant oils, seed oils, vegetable oils, deodorizer distillates, corn oils, soybean oils, algal oils, microbial oils, acid oils, biosynthetic oils, bio oils, cooking oils, greases, brown greases, yellow greases, white greases, tall oils, terpenes and other pine-related byproducts from tall oils, soapstock, lipids, fats, animal fats, tallows, lecithin, fatty acids, soaps of fatty acids, gums, phosphatide gums, glycerides, plastics, waste plastics, or pyrolysis oils from plastics.

In some embodiments, the techniques described herein relate to a process, wherein the acid includes at least one of a strong acid, a weak acid, an organic acid, or an inorganic acid.

In some embodiments, the techniques described herein relate to a process, that is performed in a tubular, turbulent-flow reactor, wherein a linear velocity of the mixture through the reactor is between 0.5 ft/s and 20 ft/s.

In some embodiments, the techniques described herein relate to a process, wherein the first temperature of the reactor is within a range from 100° C. to 350° C. and the first pressure of the reactor is within a range from 500 psig to 3,000 psig.

In some embodiments, the techniques described herein relate to a process, wherein the pressure of the reactor effluent is reduced from the first pressure to a second temperature, wherein the second temperature is less than the first temperature.

In some embodiments, the techniques described herein relate to a process, further including: after adding the acid to the reactor effluent to produce the acid-effluent mixture, feeding the acid-effluent mixture to a static mixer and a mixing section to facilitate acidulating the metal soaps, wherein the static mixer and the mixing section are in-series.

In some embodiments, the techniques described herein relate to a process wherein no acid is added to the mixture in the reactor and prior to feeding the mixture into the reactor.

In some embodiments, the techniques described herein relate to a process for reducing contaminants in a contaminated feedstock, the process including: forming a mixture by adding water to the contaminated feedstock, wherein the contaminated feedstock contains organic contaminants such as phospholipids and/or metal soaps phospholipids and/or metal soaps; feeding the mixture into a reactor and subjecting the mixture to an operating temperature, an operating pressure, and turbulent flow for a residence time to produce a reactor effluent; maintaining the operating temperature, the operating pressure, and the turbulent flow for the residence time to hydrolyze the phospholipids and produce glycerides that partition into an organic phase of the reactor effluent and phosphate salts that partition into an aqueous phase of the reactor effluent; adding acid to the reactor effluent, after hydrolyzing the phospholipids, to form an acid-effluent mixture and acidulate the metal soaps and produce fatty acids that partition into the organic phase and metal salts that partition into the aqueous phase; and separating the acid-effluent mixture into a purified feedstock including the material of the organic phase of the reactor effluent and a wastewater stream including the material of the aqueous phase of the reactor effluent.

In some embodiments, the techniques described herein relate to a process, wherein the operating temperature of the reactor is within a range from 100° C. to 350° C., wherein the operating pressure of the reactor is within a range from 500 psig to 3,000 psig.

In some embodiments, the techniques described herein relate to a process, wherein separating the reactor effluent into an organic product and an aqueous product is performed by at least one of a gravity separator, a hydrocyclone separator, a centrifugal separator, a coalescer, a vibration assisted separator, or an electrostatic assisted separator.

In some embodiments, the techniques described herein relate to a process, further including prior to forming the contaminated feedstock and water mixture, feeding the contaminated feedstock through one or more filters to remove contaminants having a diameter of 25 μm or greater.

In some embodiments, the techniques described herein relate to a process, further including prior to forming the contaminated feedstock and water mixture, heating at least one of the contaminated feedstock or the water.

In some embodiments, the techniques described herein relate to a process, wherein the contaminated feedstock and water are mixed, resulting in a mixed temperature within a range of 50° C. to 350° C.

In some embodiments, the techniques described herein relate to a process for reducing contaminants in a contaminated feedstock, wherein the contaminated feedstock contains organic contaminants such as phospholipids and/or metal soaps, the process including: heating the contaminated feedstock to a first temperature via a first heat exchanger and a feed water stream to a second temperature via a second heat exchanger; forming a mixture by feeding the contaminated feedstock and the feed water stream to a mechanical mixer; feeding the mixture into a third heat exchanger or heater and subjecting the mixture to a third temperature, a first pressure, and turbulent flow; feeding the mixture into a reactor and maintaining the third temperature, the first pressure, and the turbulent flow to produce a reactor effluent and hydrolyze the phospholipids thereby producing glycerides that partition into an organic phase of the reactor effluent and phosphate salts that partition into an aqueous phase of the reactor effluent; cooling the reactor effluent to a fourth temperature via a fourth heat exchanger; depressurizing the reactor effluent to a second pressure less than the first pressure via a pressure let-down device; adding acid to the reactor effluent, after hydrolyzing the phospholipids, to form an acid-effluent mixture and acidulate the metal soaps thereby producing fatty acids that partition into the organic phase and salts that partition into the aqueous phase; and separating the acid-effluent mixture into a purified feedstock including the material of the organic phase of the reactor effluent and a wastewater stream including the material of the aqueous phase of the reactor effluent and the contaminants.

In some embodiments, the techniques described herein relate to a process, wherein the acid is added before cooling the reactor effluent to the fourth temperature, after cooling the reactor effluent to the fourth temperature, before depressurizing the reactor effluent to the second pressure, or after depressurizing the reactor effluent to the second pressure.

In some embodiments, the techniques described herein relate to a process, wherein the third temperature of the reactor is within a range from 200° C. to 300° C., wherein the first pressure of the reactor is within a range from 500 psig to 1,500 psig.

In some embodiments, the techniques described herein relate to a process, wherein the acid is at least one of an organic acid or an inorganic acid.

In some embodiments, the techniques described herein relate to a process, further including after adding the acid to the reactor effluent to form the acid-effluent mixture, feeding the acid-effluent mixture to a static mixer to facilitate acidulating the metal soaps.

In some embodiments, the techniques described herein relate to a process, wherein the first temperature is within a range of 50° C. to 200° C. and the second temperature is within a range of 100° C. to 300° C.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWINGS

Embodiments of the present disclosure are described in detail below with reference to the attached drawing figures, wherein.

Figure 1:
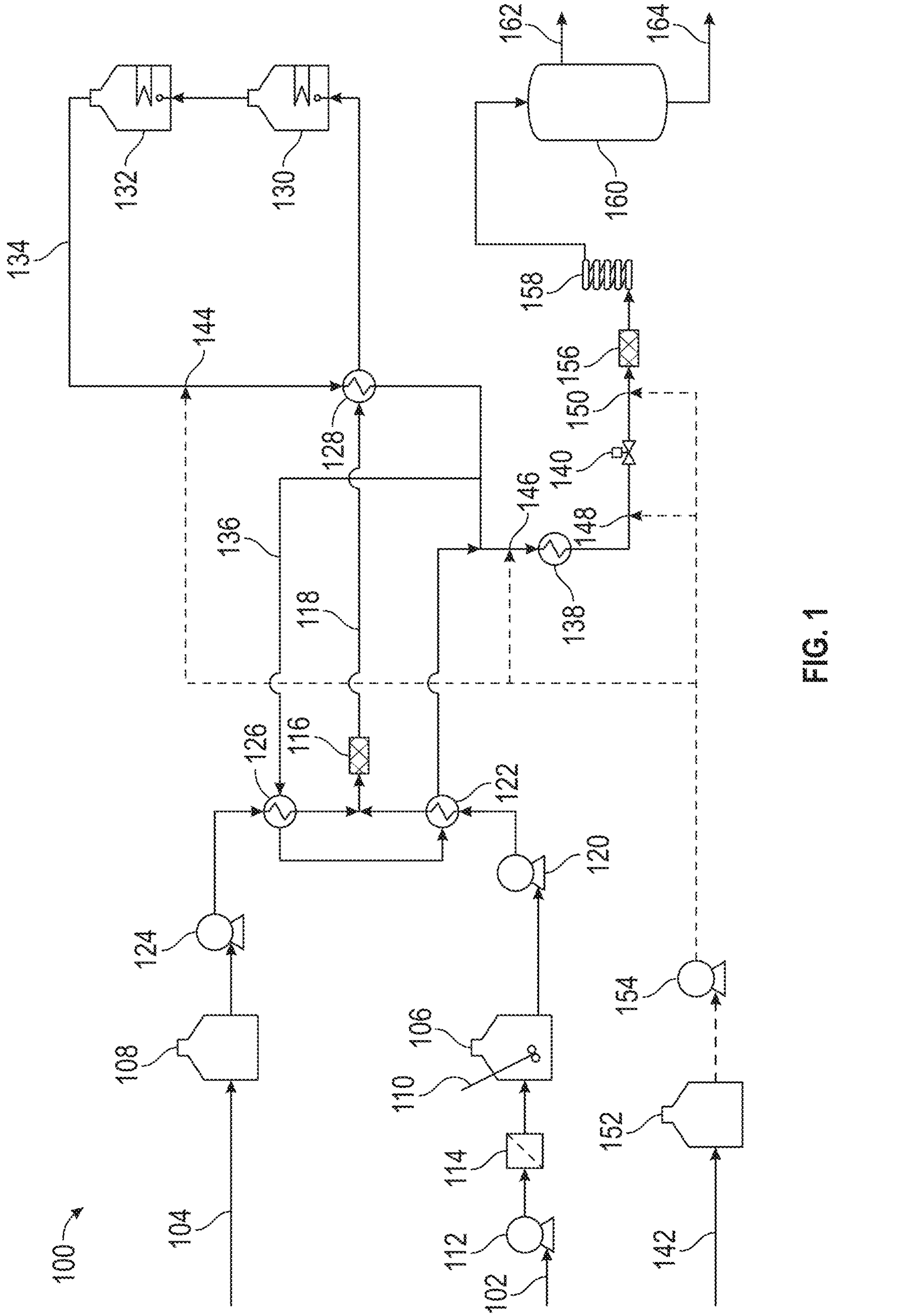
FIG. 1 depicts a schematic view of an exemplary process for decontaminating contaminated feedstock relating to some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description of embodiments of the present disclosure references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. Therefore, the following detailed description is not to be taken in a limiting sense. The scope of embodiments of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

It should be understood that any numerical range recited herein may be inclusive to the bounds of the range and include all sub-ranges subsumed therein. For example, a range of "100 to 350" may include any and all sub-ranges between and including the recited minimum value of 100 and the recited maximum value of 350, that is, all sub-ranges beginning with a minimum value equal to or greater than 100 and ending with a maximum value equal to or less than 350, and all sub-ranges in between, e.g., 100 to 157, 225 to 350, or 240 to 275. In some embodiments, residence time can be understood to refer to the average time a molecule spends within a specific system (e.g., reactor 132) or process (e.g., process 100). For example, residence time may refer to the average time a molecule spends within reactor 132. Residence time is the duration of a substance within a process item [reactor] or equipment. (Oxford Dictionary of Chemical Engineering, Oxford University Press 2014, First Edition 2014, pg. 325).

Previous techniques for cleaning renewable feedstocks include mixing together a contaminated feedstock that has both metal soaps and phospholipids with water and acid and using a reactor to remove contaminants from the feedstock. The temperature, pressure, and turbulent flow conditions of the reactor cause hydrolysis of phospholipids in the contaminated feedstock to produce glycerides and phosphate salts. Acid was added before hydrolyzing phospholipids in the reactor to avoid metal soap precipitation, expecting that metal soaps would otherwise precipitate and foul the heat exchangers and reactor. This acid addition acidulated the metal soaps, producing fatty acids and metal salts; however, non-hydratable phospholipids reacted with the acids to produce hydratable phospholipids which together with the metal salts, created foulants that deposited in the process units. Thus, although these techniques cleaned the feedstock, they also led to fouling of the process units by generating foulants from phospholipids and metal salts.

In contrast, the present disclosure unexpectedly identified that metal soaps remain in solution before the hydrolysis of phospholipids. By adding acid after hydrolysis, the phospholipids stay in solution until they are hydrolyzed and the formation of foulants is prevented. After the phospholipids are hydrolyzed, the acid acidulates the metal soaps to produce fatty acids and metal salts. The phospholipid hydrolysis products (e.g., glycerides, metal salts, and polar groups) do not form foulants with the metal salts produced by the acidulation of the metal soaps.

The present disclosure provides systems and methods for cleaning contaminated feedstocks with reduced formation of foulants or without the formation of foulants. As used herein, "cleaning," "decontaminating," or "purifying," may refer to the removal of over 95%, over 97.5%, over 99%, or over 99.5% of contaminants from the contaminated feedstock. For example, "cleaning a contaminated feedstock" may refer to removing over 99% of the contaminants from the contaminated feedstock. Similarly, "clean," "decontaminated," or "purified" may refer to a stream or feedstock that has had over 95%, over 97.5%, over 99%, or over 99.5% of contaminants removed from the stream or the feedstock. For example, a "clean oil product" may refer to a feedstock that has had over 99% of the contaminants removed from the feedstock. The systems and methods described herein may provide a reduction of metals in a feedstock to less than 5 parts per million (ppm) and a reduction of phosphorus in the feedstock to less than 2 ppm. The level of contaminants in a clean oil product may be minimized to reduce deposition, polymerization, and coking in downstream conversion equipment and deactivation, fouling or poisoning of downstream conversion catalysts.

The present disclosure includes mixing a contaminated feedstock with water and feeding the mixture to a reactor. The mixture is subject to a temperature (e.g., a temperature within a range of 100° C. to 350° C.), a pressure (e.g., a pressure within a range of 500 psig to 3,000 psig), and turbulent flow conditions (a Reynolds number greater than 4,000) to hydrolyze phospholipids in the mixture to produce a reactor effluent. After hydrolyzing the phospholipids, acid is added to the reactor effluent to acidulate metal soaps in the reactor effluent. The reactor effluent is then separated into a clean oil product and a wastewater stream, the wastewater stream containing the contaminants. Accordingly, purification of the contaminated feedstock is accomplished by hydrolysis, acidulation, and concentration of contaminants in the wastewater stream. The processes according to the present disclosure typically do not include conversion of the feedstock. By "conversion" it is meant molecular rearrangement of lipids or FFAs, such as occurs in decarboxylation, thermal cracking, isomerization, cyclization, polymerization, hydrogenation, or dehydrogenation. The purified feedstocks may be converted by other processes, downstream of the processes according to the present invention, thus reducing or eliminating problems associated with the conversion of contaminated feedstocks.

As discussed above, without adding acid prior to the reactor, metal soaps were expected to fall out of solution prior to the hydrolysis of phospholipids and foul the reactor. However, the present disclosure revealed that metal soaps remained in solution and did not foul the reactor even though the acid is added post-hydrolysis. Thus, fouling conditions are avoided as phospholipids are hydrolyzed in a mixture of feedstock and water via a reactor to produce an effluent and acid is added to the effluent after hydrolyzing the phospholipids, and the resulting effluent from the acidulation reaction has no phospholipids with which to form foulants. Accordingly, the present disclosure provides the unexpected result of preventing foulants from forming and depositing in process units while still effectively removing contaminants from feedstocks when acid is added post-hydrolysis.

FIG. 1 depicts a schematic view of an exemplary process 100 for cleaning a contaminated feedstock stream 102. In some embodiments, contaminated feedstock stream 102 may comprise greater than 100 parts per million (ppm), greater than 200 ppm, greater than 300 ppm, greater than 400 ppm, or greater than 500 ppm of metals content and/or phosphorus content. For example, animal fat may comprise a range of 300 ppm to 600 ppm of metals content and 200 ppm to 600 ppm of phosphorus content. Accordingly, process 100 described herein may reduce the total metals and phosphorus content in a contaminated feedstock to less than 5 ppm metals content and less than 2 ppm phosphorus content. For example, the process according to the present disclosure and more specifically process 100 may reduce a total metals and phosphorus content in a contaminated feedstock from hundreds of ppm, such as greater than 100 ppm, greater than 200 ppm, greater than 300 ppm, greater than 400 ppm, or greater than 500 ppm of metals and/or phosphorus, to less than 5 ppm metals and less than 2 ppm phosphorus in less than 2 minutes of residence time.

Process 100 comprises a contaminated feedstock stream 102 and a feed water stream 104. The contaminated feedstock stream 102 comprises a contaminated feedstock, which may include any combination of oils, plant oils (e.g., virgin plant oils), seed oils (e.g., *Carinata* oils and/or Pongamia oils), vegetable oils (e.g., waste vegetable oils, canola oils, castor oils, Jatropha oils, palm oils, and/or Tung oils), deodorizer distillates, corn oils (e.g., corn oils derived from distiller grains), soybean oils, algal oils, microbial oils, acid oils, biosynthetic oils (e.g., biosynthetic oils derived from pyrolysis, esterification, oligomerization, and/or polymerization), bio oils, pyrolysis oils, cooking oils (e.g., used cooking oils), greases, brown greases (e.g., greases from grease traps and/or wastewater treatment), yellow greases (e.g., greases from cooking oil), white greases, tall oils (e.g., crude tall oils and derivatives thereof), terpenes and other pine-related byproducts from tall oils, soapstock, lipids, fats (e.g., waste fats), animal fats (e.g., poultry fats), tallows, lecithin, fatty acids (e.g., free fatty acids), soaps of fatty acids, gums, phospholipids, phosphatide gums, glycerides (e.g., triglycerides, diglycerides, and/or monoglycerides), plastics, waste plastics, or pyrolysis oils from plastic (PPO), as well as any other suitable feedstocks, feedstock blends, and constituents thereof. It should be appreciated that the feedstocks described herein may be in the form of blends and/or emulsions.

Additionally, contaminated feedstock stream 102 comprises contaminants, such as for example inorganic contaminants, organic contaminants, phosphorus, phosphorus-containing species, phospholipids, gums, halides, such as chlorine, bromine, fluorine and iodine, metalloids, such as boron, silicon, and arsenic, metals, such as sodium, potassium, iron, aluminum, nickel, vanadium, zinc, chromium, tin, and lead, divalent metals, such as calcium and magnesium, metal soaps, proteins, silicone, chloride, methanol, ethanol, glycerol, and polymers, such as polyethylene, as well as other similar contaminants.

In some embodiments, contaminated feedstock stream 102 may be fed to an oil feed tank 106 to control at least one of a temperature, a pressure, or a flow rate of contaminated feedstock stream 102. For example, oil feed tank 106 may control the temperature and flow rate of contaminated feedstock stream 102. Similarly, feed water stream 104 may be fed to a water feed tank 108 to control at least one of a temperature, a pressure, or a flow rate of feed water stream 104. Embodiments are contemplated in which other forms of controlling the temperature, the pressure, and/or the flow rate may be utilized to control the conditions of contaminated feedstock stream 102 and/or feed water stream 104. For example, any combination of pumps, heating elements, or control valves, as well as other active or passive control means may be utilized to control the conditions of contaminated feedstock stream 102 and/or feed water stream 104.

In some embodiments, oil feed tank 106 may comprise a mixer 110 to mix contaminated feedstock stream 102. In some embodiments, mixer 110 may prevent contaminated feedstock stream 102 from forming distinct layers. For example, if contaminated feedstock stream 102 comprises an emulsion of oil and water, mixer 110 may be utilized to prevent the oil and water from demulsifying. Further, mixer 110 may prevent contaminated feedstock stream 102 from becoming a heterogeneous mixture. For example, if contaminated feedstock stream 102 comprises a plurality of feedstocks, mixer 110 may cause the mixture to be homogeneous throughout.

In some embodiments, process 100 may further comprise a pump 112. The process 100 may also comprise a filter 114 for filtering solid contaminants from contaminated feedstock stream 102. In some embodiments, pump 112 may provide a pressure differential to flow contaminated feedstock stream 102 through filter 114. Pump 112 may be a low-pressure pump configured to pressurize contaminated feedstock stream to a pressure of up to 50 pounds per square inch gauge (psig), up to 100 psig, up to 150 psig, up to 200 psig, or up to 250 psig. Pump 112 may be any type of pressurization device now known or later developed, such as a positive displacement pump, a rotary pump, a reciprocating pump, an axial-flow pump, a radial-flow pump, or a regenerative turbine pump.

Filter 114 removes solids and/or contaminants having a diameter of 250 microns (μm) or greater, 200 μm or greater, 150 μm or greater, 100 μm or greater, 75 μm or greater, or 50 μm or greater from contaminated feedstock stream 102. For example, filter 114 may be configured to remove solids having a diameter of 100 μm or greater from contaminated feedstock stream 102. In some embodiments, filter 114 may remove over 25%, over 50%, over 75%, or over 99.9% of solid contaminants from contaminated feedstock stream 102. In some embodiments, filter 114 may be one or more filters configured to remove solid contaminants from contaminated feedstock stream 102. For example, process 100 may comprise a first filter/screen for removing solids having a diameter of 1000 μm or 2000 μm or greater from contaminated feedstock stream 102 and a second filter for removing solids having a diameter of 100 μm or 250 μm or greater from contaminated feedstock stream 102. Embodiments are contemplated in which filter 114 may remove solids and/or contaminants having a diameter of less than 100 μm, less than 75 μm, or less than 50 μm from contaminated feedstock stream 102.

Contaminated feedstock stream 102 and feed water stream 104 may be fed to a static mixer 116 to form a mixture 118. Static mixer 116 causes mixing and intimate contact of contaminated feedstock stream 102 and feed water stream 104. Intimate contact of the two phases may be maintained throughout all downstream process equipment by maintaining turbulent flow conditions. Turbulent flow conditions are defined for purposes of this disclosure as maintaining a Reynolds number above 4,000. Embodiments are contemplated in which mixing may be provided by any combination of mixing devices now known or later developed. In some embodiments, the weight ratio of water to contaminated feedstock in mixture 118 may be between 1:100 and 3:1, between 1:75 and 5:2, between 1:50 and 2:1, between 1:25 and 3:2, or between 1:10 and 1:1. Embodiments are contemplated in which other ranges of weight ratio of water to contaminated feedstock may be utilized. In some embodiments, the weight ratio of water to contaminated feedstock in mixture 118 may depend at least in part on at least one of the type of feedstock being treated, the type of contaminants in the contaminated feedstock, or the type of acid added to process 100 (described further below).

In some embodiments, contaminated feedstock stream 102 and/or feed water stream 104 may be pressurized and heated prior to mixing at static mixer 116. Accordingly, process 100 may further comprise a pump 120 and a heat exchanger 122 for pressurizing and heating contaminated feedstock stream 102, respectively. Pump 120 may be utilized to pressurize contaminated feedstock stream 102. In some embodiments, pump 120 may be a high-pressure pump configured to pressurize contaminated feedstock stream 102 to a pressure of up to 500 psig, up to 1,000 psig, up to 1,500 psig, up to 2,000 psig, up to 2,500 psig, or up to 3,000 psig. Heat exchanger 122 may be utilized to heat contaminated feedstock stream 102. In some embodiments, heat exchanger 122 may heat contaminated feedstock stream 102 to a temperature of up to 100 degrees Celsius (° C.), up to 150° C., up to 200° C., up to 250° C., up to 300° C., or up to 350° C. For example, heat exchanger 122 may heat contaminated feedstock stream 102 to a temperature within a range of 50° C. to 350° C., such as 85° C. to 350° C., 120° C. to 350° C., 50° C. to 200° C., 85° C. to 200° C., or 120° C. to 200° C.

Process 100 may further comprise a pump 124 and a heat exchanger 126 for pressurizing and heating feed water stream 104, respectively. Similar to pump 120 and heat exchanger 122, pump 124 may pressurize feed water stream 104, and heat exchanger 126 may heat the feed water stream 104. In some embodiments, pump 124 may be a high-pressure pump configured to pressurize feed water stream 104 to a pressure of up to 500 psig, up to 1,000 psig, up to 1,500 psig, up to 2,000 psig, up to 2,500 psig, or up to 3,000 psig. Embodiments are contemplated in which pump 120 and pump 124 may each be any type of pressurization device now known or later developed, such as the pressurization devices described herein. In some embodiments, heat exchanger 126 may heat feed water stream 104 to a temperature of up to 100° C., up to 150° C., up to 200° C., up to 250° C., up to 300° C., or up to 350° C. For example, heat exchanger 126 may heat feed water stream 104 to a temperature within a range of 100° C. to 300° C. Embodiments are contemplated in which heat exchanger 122 and heat exchanger 126 may each be any type of heater or heat exchanger now known or later developed, such as the heaters and heat exchangers described herein. In some embodiments, heating contaminated feedstock stream 102 and/or feed water stream 104 prior to forming mixture 118 may decrease the fouling rate of process 100. The effect of the temperature of contaminated feedstock stream 102 and/or feed water stream 104 on the formation of foulants is described further below in FIG. 4.

Mixture 118 may be heated using a heat exchanger 128. In some embodiments, heat exchanger 128 may comprise any combination of a shell and tube heat exchanger, a shell and coil heat exchanger, a feed-effluent heat exchanger, a plate and frame heat exchanger, a spiral heat exchanger, direct steam injection, furnaces, microwave heater, boilers, or condensers, as well as any other suitable heating device. In some embodiments, the process stream may be on the tube side or the shell side of the heat exchanger. For example, for feed-effluent heat exchangers, the feed may be on the tube side with the effluent on the shell side; alternatively, the feed may be on the shell side with the effluent on the tube side. Further, in some embodiments, heat exchanger 128 may utilize any combination of co-current flow, countercurrent flow, or crossflow, as well as any other suitable flow arrangement. Any of the heat exchangers discussed herein may be heated and/or cooled by any process or device known in the art, including hot oil, high pressure steam, and heat recovery from other streams, such that the overall thermal efficiency may be optimized. Embodiments are contemplated in which one or more heat exchangers may be utilized to heat the mixture 118.

Mixture 118 may be further heated using preheater 130 prior to feeding mixture 118 to reactor 132. In some embodiments, preheater 130 may heat mixture 118 to an operating temperature of reactor 132, as described in more detail below. For example, preheater 130 may heat mixture 118 to a temperature within a range of 100° C. to 350° C., within a range of 125° C. to 325° C., within a range of 150° C. to 300° C., within a range of 200° C. to 300° C., or within a range of 250° C. to 300° C. Preheater 130 may be any type of heater or heat exchanger now known or later developed, such as the heaters and heat exchangers described herein. For example, preheater 130 may be a fired heater, electric heater, or microwave heater configured to heat mixture 118 to an operating temperature of reactor 132. Embodiments are contemplated in which any number of heat exchangers and/or preheaters may heat mixture 118 to the operating temperature of reactor 132. For example, heat exchangers 122 and 126 may be omitted such that heat exchanger 128 and preheater 130 heats mixture 118 to the operating temperature.

Mixture 118 is then fed to reactor 132 to hydrolyze one or more contaminants within mixture 118. In some embodiments, the operating conditions of reactor 132 may cause hydrolysis of phospholipids and/or organic chlorides, as well as other suitable contaminants in mixture 118. For example, feeding mixture 118 to reactor 132 may cause hydrolysis of phospholipids, such as phospholipids according to the formula:

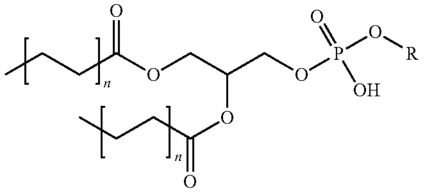

or

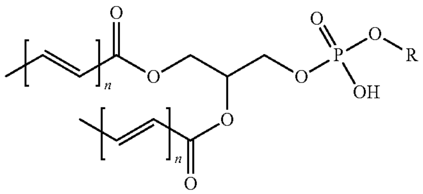

to produce glycerides, such as diglycerides according to the formula:

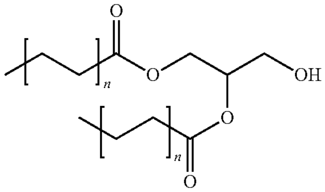

or

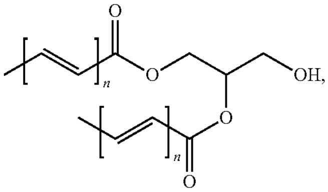

, phosphate salts, such as phosphate salts from phosphoric acid according to the formula:

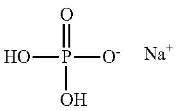 or 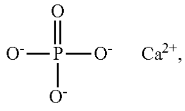, and polar compounds, such as polar compounds according to the formula:

R—OH wherein n may be any integer, such as an integer within a range from 1 to 10, and R is selected from a group consisting of hydrogen, a halogen, a hydrocarbon, an alkyl, an alkenyl, an alkynyl, an aryl, an oligomer, and a polymer, each of which can comprise a hydroxyl, a ketone or an aldehyde group, as well as combinations thereof. For example, R may be selected from a group consisting of hydrogen, choline, ethanolamine, and inositol. In some embodiments, the hydrolysis of phospholipids is dependent on temperature and residence time. For example, operating reactor 132 at a higher temperature may increase the rate of hydrolysis of the phospholipids and/or having a greater residence time may increase the extent of hydrolysis of the phospholipids.

In some embodiments, the hydrolysis of the phospholipids, gums, and/or organic chlorides causes little to no mass loss of organic product. Accordingly, glycerides produced via the hydrolysis of phospholipids and/or gums and fatty acids produced via the hydrolysis of organic chlorides may partition into an organic phase of mixture 118. Additionally, phosphate salts produced via the hydrolysis of phospholipids and/or gums and chlorides produced via the hydrolysis of organic chlorides may partition into an aqueous phase of mixture 118. Further, the operating conditions of reactor 132 may facilitate the dissolution of inorganic salts into the aqueous phase of mixture 118. Reactor 132 may be operated at conditions (e.g., temperatures less than 450° C.) where conversion reactions (e.g., polymerization or thermal cracking) do not typically occur.

The operating conditions of reactor 132 may comprise any combination of a Reynolds number greater than 4,000, greater than 8,000, greater than 10,000, greater than 25,000, greater than 50,000, greater than 100,000, greater than 250,000, greater than 500,000, greater than 750,000, greater than 1,000,000, greater than 1,250,000, greater than 1,500,000, greater than 1,750,000, or greater than 2,000,000, a linear velocity greater than 0.5 feet per second (ft/s), greater than 1 ft/s, greater than 2 ft/s, greater than 3 ft/s, greater than 4 ft/s, greater than 5 ft/s, greater than 7.5 ft/s, greater than 10 ft/s, greater than 15 ft/s, greater than 20 ft/s, between 0.5 ft/s and 20 ft/s, between 1 ft/s and 10 ft/s, or between 3 ft/s and 10 ft/s, a temperature within a range of 100° C. to 350° C., within a range of 125° C. to 325° C., within a range of 150° C. to 300° C., within a range of 200° C. to 300° C., or within a range of 250° C. to 300° C., and a pressure within a range of 500 psig to 3,000 psig, within a range of 500 psig to 2,500 psig, within a range of 500 psig to 2,000 psig, within a range of 500 psig to 1,500 psig, or within a range of 750 psig to 1,250 psig. Reactor 132 may maintain the operating conditions (e.g., operating temperature, operating pressure, and/or turbulent flow conditions) for a residence time within a range of 10 seconds to 30 minutes, a range of 10 seconds to 25 minutes, a range of 10 seconds to 20 minutes, a range of 10 seconds to 15 minutes, a range of 10 seconds to 10 minutes, a range of 10 seconds to 5 minutes, or up to 2 minutes. Residence time is defined as the average time a molecule spends within a specific system (e.g., reactor 132) or process (e.g., process 100). For example, residence time may refer to the average time a molecule spends within reactor 132. Residence time is the duration of a substance within a process item [reactor] or equipment. (Oxford Dictionary of Chemical Engineering, Oxford University Press 2014, First Edition 2014, pg. 325).

In some embodiments, the operating conditions of reactor 132 may comprise a Reynolds number greater than 4,000, a residence time within a range of 10 seconds to 30 minutes, a temperature within the range of 100° C. to 350° C., and a pressure within the range of 500 psig to 2,500 psig. In some embodiments, the operating conditions of reactor 132 may comprise a Reynolds number greater than 1,000,000, a temperature within the range of 200° C. to 300° C., and a pressure within the range of 500 psig to 1,500 psig. For example, the operating conditions may comprise a Reynolds number greater than 1,000,000, a temperature of 240° C., and a pressure of 1,000 psig. The operating conditions within reactor 132 cause contaminants from the organic phase of the contaminated feedstock to be transferred into the aqueous phase, such that the organic phase of reactor effluent 134 contains a lower concentration of contaminants than the organic phase of mixture 118 fed to reactor 132. Further, the aqueous phase of reactor effluent 134 contains a higher concentration of contaminants than the aqueous phase of mixture 118 fed to reactor 132.

Reactor 132 may comprise any combination of a continuous-flow reactor, a plug-flow reactor, a continuous stirred-tank reactor, or a tubular turbulent-flow reactor, as well as any other suitable reactors. Additionally, reactor 132 may be operated as any combination of a continuous process, an adiabatic process, an isobaric process, an isochoric process, or an isothermal process, as well as any other suitable process. For example, reactor 132 may be run as an isobaric process such that the pressure within reactor 132 remains constant. In another example, reactor 132 may be run as an isothermal process such that the temperature within reactor 132 remains constant. Embodiments are contemplated in which reactor 132 may be heated externally and/or is insulated. For example, reactor 132 may be a heated tube or coil such that mixture 118 is heated while flowing through reactor 132.

A reactor effluent 134 from reactor 132 may then be sent to heat exchanger 128 to cool the effluent while heating mixture 118 being fed to reactor 132. Reactor effluent 134 may optionally be sent to heat exchanger 126 and/or heat exchanger 122 via a stream 136 to heat feed water stream 104 and/or contaminated feedstock stream 102. In some embodiments, all, none, or at least a portion of reactor effluent 134 may provide heat to heat exchanger 126 and/or heat exchanger 122. For example, all of reactor effluent 134 may be sent to provide heat to heat exchanger 126 and then to provide heat to heat exchanger 122 via stream 136. Reactor effluent 134 may be further cooled by a heat exchanger 138. Heat exchanger 128 and/or heat exchanger 138 may cool reactor effluent 134 to a temperature suitable for separating an organic phase and an aqueous phase of the reactor effluent 134. For example, heat exchanger 128 and/or heat exchanger may cool reactor effluent 134 to a temperature of less than 150° C., less than 125° C., less than 100° C., less than 75° C., or less than 50° C. Heat exchanger 138 may be any heat exchanger now known or later developed, such as the types of heat exchangers described herein.

Reactor effluent 134 from reactor 132 may then be sent to pressure let-down device 140 to decrease the pressure of reactor effluent 134. Pressure let-down device 140 may depressurize reactor effluent 134 to a pressure of less than 250 psig, less than 200 psig, less than 150 psig, less than 100 psig, or less than 50 psig. In some embodiments, one or more stage or valves may be utilized to depressurize reactor effluent 134. Embodiments are contemplated in which pressure let-down device 140 may be any combination of depressurization devices now known or later developed, such as a valve, an expander, an orifice, or a capillary. For example, pressure let-down device 140 may be a pressure let-down valve. In some embodiments, decreasing the temperature and the pressure of reactor effluent 134 may facilitate separation of the organic phase and the aqueous phase of reactor effluent 134 via separator 160 described further below.

As described above, an acid stream 142 may be added to reactor effluent 134 to form an acid-effluent mixture and cause acidulation of the metals and/or metal soaps found in contaminated feedstock stream 102. For example, adding acid stream 142 to reactor effluent 134 may cause the acidulation of metal soaps, such as metal soaps according to the formula:

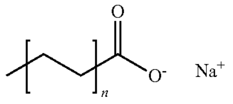 or 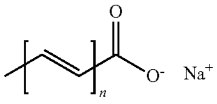

to produce fatty acids, such as fatty acids according to the formula:

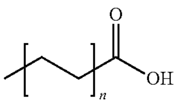 or 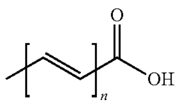

and metal salts, such as metal salts according to the formula:

$Na^+A^-$ wherein n may be any integer, such as an integer within a range from 1 to 10 and $A^-$ may be a conjugate base of an acid from acid stream 142 that has donated a proton (e.g., a chloride ion ($Cl^-$) that is a conjugate base of hydrochloric acid (HCl)) to produce the fatty acid according to the above formula. Although the above formulas use a sodium metal soap as an example, other metals and/or metal soaps are acidulated similarly. In some embodiments, the acidulation of metals and/or metal soaps occurs rapidly at operating temperatures of process 100 (e.g., any of the temperatures described herein). Further, the acidulation of metals and/or metal soaps causes no mass loss of organic product. Accordingly, the fatty acids formed via the acidulation of metals and/or metal soaps may partition into an organic phase of reactor effluent 134 and the salts formed via the acidulation of metals and/or metal soaps may partition into an aqueous phase of reactor effluent 134.

Acid stream 142 may be added to reactor effluent 134 at acid injection point 144, at acid injection point 146, at acid injection point 148, or at acid injection point 150, as well as combinations thereof. In some embodiments, acid stream 142 may be added to reactor effluent 134 downstream from reactor 132 (e.g., at acid injection point 144), downstream from heat exchanger 128 (e.g., at acid injection point 146), downstream from heat exchanger 138 (e.g., at acid injection point 148), upstream from pressure let-down device 140 (e.g., at acid injection point 148), or downstream from pressure let-down device 140 (e.g., at acid injection point 150), as well as combinations thereof. The location in which acid stream 142 is added may affect the formation of foulants. For example, adding acid stream 142 after reactor 132 reduces or prevents the formation of foulants in heat exchangers and reactor piping compared to previous techniques, such as adding acid before reactor 132. The effect of the acid injection location in process 100 on the formation of foulants is described further below in FIGS. 2-3. In some embodiments, acid stream 142 may comprise at least one of a strong acid, a weak acid, an organic acid, such as citric acid or acetic acid, or an inorganic acid, such as carbonic acid or sulfuric acid. For example, acid stream 142 may comprise citric acid. In some embodiments, acid stream 142 may comprise any combination of a strong acid, a weak acid, an organic acid, or an inorganic acid (i.e., a mineral acid). For example, acid stream 142 may comprise citric acid and acetic acid.

In some embodiments, process 100 may further include an acid tank 152 for controlling at least one of a temperature, a pressure, or a flow rate of acid stream 142. Embodiments are contemplated in which other forms of controlling the temperature, the pressure, and/or the flow rate may be utilized to control the conditions of acid stream 142. Process 100 may further comprise a pump 154 for pressurizing acid stream 142. Pump 154 may be any type of pressurization device now known or later developed, such as the pressurization devices described herein. In some embodiments, pump 154 may deliver acid stream 142 to reactor effluent 134 after reactor 132, after heat exchanger 128, after heat exchanger 138, before pressure let-down device 140, and/or after pressure let-down device 140.

Process 100 may further comprise a static mixer 156 and a mixing section 158 to cause mixing and intimate contact of acid stream 142 and reactor effluent 134 to thereby facilitate the acidulation of the metal soaps. Static mixer 156 and mixing section 158 may be in-series such that reactor effluent 134 flows directly from static mixer 156 to mixing section 158. Embodiments are contemplated in which reactor effluent 134 may be fed to mixing section 158 prior to being fed to static mixer 156 or fed simultaneously to static mixer 156 and mixing section 158. Embodiments are contemplated in which mixing of acid stream 142 and reactor effluent 134 may be provided by any combination of mixing devices now known or later developed. For example, acid stream 142 and reactor effluent 134 may be mixed in a secondary reactor similar to reactor 132 to form an acid-effluent mixture and acidulate the metal soaps to produce metal salts that partition into the aqueous phase and fatty acids that partition into the organic phase. In some embodiments, static mixer 156 and/or mixing section 158 may have a residence time of up to 5 minutes, up to 4 minutes, up to 3 minutes, up to 2 minutes, up to 1 minute, up to 45 seconds, up to 30 seconds, or up to 15 seconds. For example, mixing section 158 may have a residence time of 30 seconds. Embodiments are contemplated in which static mixer 156 and/or mixing section 158 may have a residence time greater than 5 minutes.

Although, static mixer 156 and mixing section 158 are depicted as downstream from pressure let-down device 140, embodiments are contemplated in which static mixer 156 and/or mixing section 158 may be directly downstream from the injection location of acid stream 142. For example, for a case in which acid stream 142 is added at acid injection point 144, static mixer 156 and mixing section 158 may be directly downstream from acid injection point 144, such that the static mixer 156 and mixing section 158 are upstream from heat exchanger 128. In some embodiments, static mixer 156 and/or mixing section 158 may be directly downstream from at least one of acid injection point 144, acid injection point 146, acid injection point 148, or acid injection point 150. Embodiments are contemplated in which at least one of static mixer 156 or mixing section 158 may be omitted from process 100. For example, static mixer 156 and mixing section 158 may be omitted from process 100, such that acid stream 142 is mixed with reactor effluent 134 using turbulent flow.

The acid-effluent mixture (i.e., the mixture of reactor effluent 134 and acid stream 142) may then be fed to a separator 160 to separate the acid-effluent mixture into a clean oil stream 162 and a wastewater stream 164. In some embodiments, separator 160 may comprise any combination of a gravity separator, a hydrocyclone separator, a centrifugal separator, a coalescer, a vibration assisted separator, or an electrostatic assisted separator such as those used for crude oil desalting, as well as any other suitable separation device. For example, separator 160 may be an oil-water separator configured to separate an organic phase and an aqueous phase of reactor effluent 134. Embodiments are contemplated in which separation may be facilitated by demulsifying agents.

In some embodiments, clean oil stream 162 comprises the matter of the organic phase of reactor effluent 134. Further, clean oil stream 162 may comprise the cleaned feedstock (i.e., the matter of the organic phase of contaminated feedstock stream 102) and glycerides and/or fatty acids produced via the hydrolysis and/or acidulation of one or more contaminants. For example, clean oil stream 162 may comprise the clean feedstock from contaminated feedstock stream 102, glycerides produced via the hydrolysis of phospholipids and/or gums, and fatty acids produced via the hydrolysis of organic chlorides and/or the acidulation of soaps. Clean oil stream 162 may have less than 5%, less than 2.5%, less than 1%, or less than 0.5% of the contaminants from contaminated feedstock stream 102. For example, contaminated feedstock stream 102 may have greater than 1000 ppm of total metals and greater than 800 ppm of total phosphorus and clean oil stream 162 may have less than 5 ppm of total metals and less than 2 ppm of total phosphorus.

In some embodiments, clean oil stream 162 may be further processed (not shown) into chemicals or fuels depending on the type of feedstocks treated and the product objectives. Renewable feedstocks may be hydrothermally cracked into synthetic crude via a high-rate hydrothermal reactor system and then hydrotreated into transportation fuels or chemicals. Exemplary forms of a high-rate hydrothermal reactor system are described in detail in earlier filed U.S. Pat. No. 12,173,239, which is hereby incorporated by reference in its entirety into the present application. Alternatively, clean oil stream 162 may be converted into biodiesel via esterification or converted into renewable fuels and chemicals via hydrotreatment, hydroisomerization, hydrocracking, or other conventional refining processes.

In some embodiments, wastewater stream 164 comprises the matter of the aqueous phase of reactor effluent 134. Further, wastewater stream 164 may comprise one or more contaminants (e.g., metals, phosphorus, and other contaminants described herein) from contaminated feedstock stream 102 or produced during process 100 and water from feed water stream 104. For example, wastewater stream 164 may comprise water and contaminants such as metals, phosphorus, inorganic salts, phosphate salts, and chlorides, as well as other contaminants. In some embodiments, at least a portion of wastewater stream 164 may be treated and reused, further processed to recover byproducts, applied to land, de-watered and used as an animal feed supplement, or treated in conventional wastewater treatment processes (not shown). For example, a portion of wastewater stream 164 may be treated and recycled such that the recycled water constitutes at least a portion of feed water stream 104. The treatment of wastewater stream 164 may depend at least in part on the constituents of the feedstock and the water recovery and reuse objectives.

Experimental data are shown in Tables 1-5 below. Table 1 shows the feed properties and the location that acid was injected. Conditions C1-C2, and C3-C5T used animal fat as the feedstocks for the test runs. Conditions C2a, C5TBG-C6, and C7a-C8 utilized mixed feedstocks for the test runs. Conditions C2a and C6 utilized a 1:1 ratio of animal fat (AF) to crude soybean oil (CSBO), conditions C5TBG and C5TBG2 utilized a 4:1 ratio of animal fat to brown grease (BG), condition C7a utilized a 97:3 ratio of animal fat to soapstock, and condition C8 utilized an unfiltered feed (UFF) of a 97:3 ratio of animal fat to soapstock as feedstocks for the test runs. The total metals and total phosphorus (P) measured in each feedstock is shown in Table 1. Conditions C1-C4 had acid injected at static mixer 116 (Oil Water Mix), conditions C5-C5TBG had acid injected directly downstream from preheater 130 (Post-PH), conditions C5TBG2 and C6 had acid injected directly downstream from reactor 132 at acid injection point 144, and conditions C7a and C8 had acid injected directly downstream from pressure letdown device 140 at acid injection point 150.

TABLE 1

Feed Properties and Acid Injection Location for Conditions C1-C8

| Condition | Feed | Total Metals of Feed (PPM) | Total P of Feed (PPM) | Acid Injection Location |
|---|---|---|---|---|
| C1 | Animal Fat | 341 | 225 | Oil Water Mix |
| C1.2 | Animal Fat | 338 | 212 | Oil Water Mix |
| C1.3 | Animal Fat | 305 | 200 | Oil Water Mix |
| C1.4 | Animal Fat | 294 | 191 | Oil Water Mix |
| C2 | Animal Fat | 414 | 302 | Oil Water Mix |
| C2a | 50/50 AF/CSBO | 535 | 613 | Oil Water Mix |
| C3 | Animal Fat | 344 | 221 | Oil Water Mix |
| C4 | Animal Fat | 330 | 214 | Oil Water Mix |
| C5 | Animal Fat | 335 | 206 | Post-PH |
| C5T | Animal Fat | 369 | 223 | Post-PH |
| C5TBG | 80/20 AF/BG | 325 | 320 | Post-PH |
| C5TBG2 | 80/20 AF/BG | 367 | 193 | Post-RXR |
| C6 | 50/50 AF/CSBO | 534 | 555 | Post-RXR |
| C7a | 97/3 AF/Soapstock | 503 | 229 | Post-PLD |
| C8 | UFF 97/3 AF/Soapstock | 604 | 266 | Post-PLD |

Table 2 contains the results from each test including the run duration, the differential pressure of process 100 at shutdown, and the percentage reduction of metals and phosphorus. Each test run of the process continued until the process had an increase in pilot system differential pressure of greater than 80 psi. The differential pressure of the process is directly proportional to the formation of foulants in the process. For example, an increased differential pressure suggests that more foulants have formed in the pilot system components. Accordingly, test runs of the process continued until significant fouling of the process occurred (e.g., the process having a differential pressure of 80 psi or greater, 90 psi or greater, or 100 psi or greater). Test runs that were shutdown prior to the process having a differential pressure of 80 psi or greater were intentionally stopped (e.g., ran out of feedstock material or it was determined that no fouling was occurring). Table 2 further shows that each test run of the process resulted in a clean feedstock stream regardless of acid injection location.

TABLE 2

Results for Conditions C1-C8

| Condition | Run Duration (hr) | Differential Pressure at Shutdown (PSI) | % Reduction of Metals | % Reduction of P |
|---|---|---|---|---|
| C1 | 15 | 88 | 99.5% | 99.2% |
| C1.2 | 29 | 100 | 98.5% | 99.0% |
| C1.3 | 28 | 120 | 99.0% | 99.0% |
| C1.4 | 21 | 101 | 98.6% | 99.5% |
| C2 | 83 | 184 | 99.4% | 99.6% |
| C2a | 35 | 99 | 99.5% | 99.3% |
| C3 | 19 | 92 | 99.4% | 99.5% |
| C4 | 62 | 101 | 98.1% | 98.5% |
| C5 | 65 | 118 | 98.6% | 98.4% |
| C5T | 51 | 128 | 98.6% | 99.2% |
| C5TBG | 21 | 117 | 97.8% | 99.4% |
| C5TBG2 | 70 | 23 | 98.6% | 98.9% |
| C6 | 100 | 29 | 99.5% | 98.8% |
| C7a | 60 | 20 | 99.7% | 99.0% |
| C8 | 100 | 10 | 98.7% | 99.1% |

Figure 2:
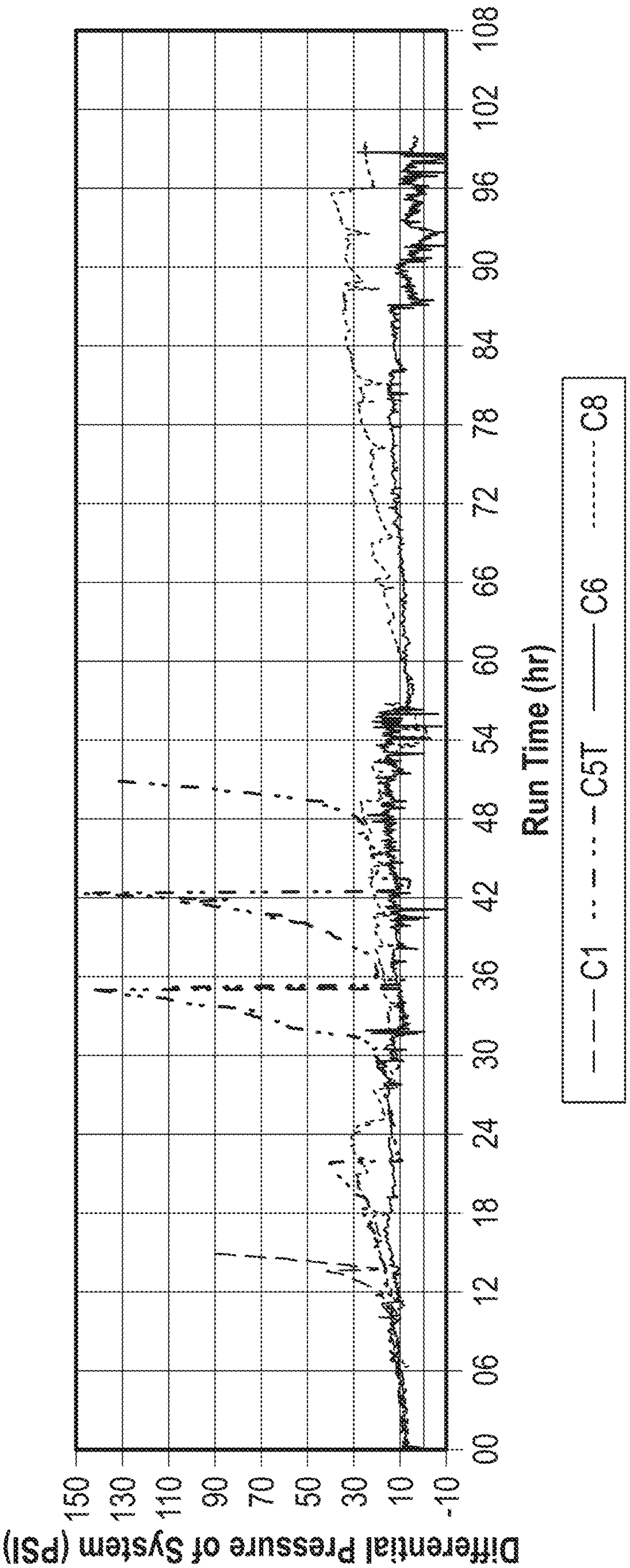
FIG. 2 depicts a graph of the effect of acid injection locations in the process depicted in FIG. 1 on the differential pressure over time relating to some embodiments.

FIG. 2 depicts the effect that acid injection location has on foulant formation and the run time before significant fouling occurs. Table 3 shows the run duration and the differential pressure of the process at the end of each test run as depicted in FIG. 2. Further, Table 3 compares the injection location and the differential pressure indicative of the amount of foulants that are formed in the process. Condition C1 utilized animal fat as a feedstock and injected the acid to static mixer 116 of process 100 to act as a baseline test for cleaning contaminated feedstock using techniques described herein. Condition C5T also utilized animal fat as a feedstock and injected the acid directly downstream from preheater 130 of process 100. Condition C6 utilized approximately a 1:1 ratio of animal fat to crude soybean oil as a feedstock and injected the acid directly downstream from reactor 132 of process 100. Condition C8 utilized a 97:3 ratio of animal fat to soapstock as a feedstock and injected the acid directly downstream from pressure let-down device 140 of process 100.

TABLE 3

Summary for Conditions C1, C5T, C6, and C8

| Condition | C1 | C5T | C6 | C8 |
|---|---|---|---|---|
| Feed | Animal Fat | Animal Fat | ~50/50 AF/CSBO | UFF 97/3 AF/Soapstock |
| Acid Injection Location | Oil Water Mix | Post-PH | Post-RXR | Post-PLD |
| Run Duration (hr) | 15 | 51 | 100 | 100 |
| Differential Pressure at Shutdown (PSI) | 88 | 128 | 29 | 10 |

As depicted in FIG. 2, conditions C1 and C5T reached a pressure differential of above 80 psi during the test runs, indicating fouling. In contrast, conditions C6 and C8 did not exhibit significant fouling of the process during the test runs. The results of conditions C6 and C8 show the above-described unexpected result of not forming foulants by injecting the acid after hydrolyzing the phospholipids in the feedstock (i.e., downstream from reactor 132). Conditions C6 and C8 further exhibit this unexpected result by not forming foulants while decontaminating feedstocks that are harder to clean than the animal fat utilized in conditions C1 and C5T. Accordingly, injecting the acid downstream from reactor 132 (e.g., directly downstream from reactor 132, directly downstream from pressure let-down device 140) resulted in little to no fouling of the process.

Figure 3:
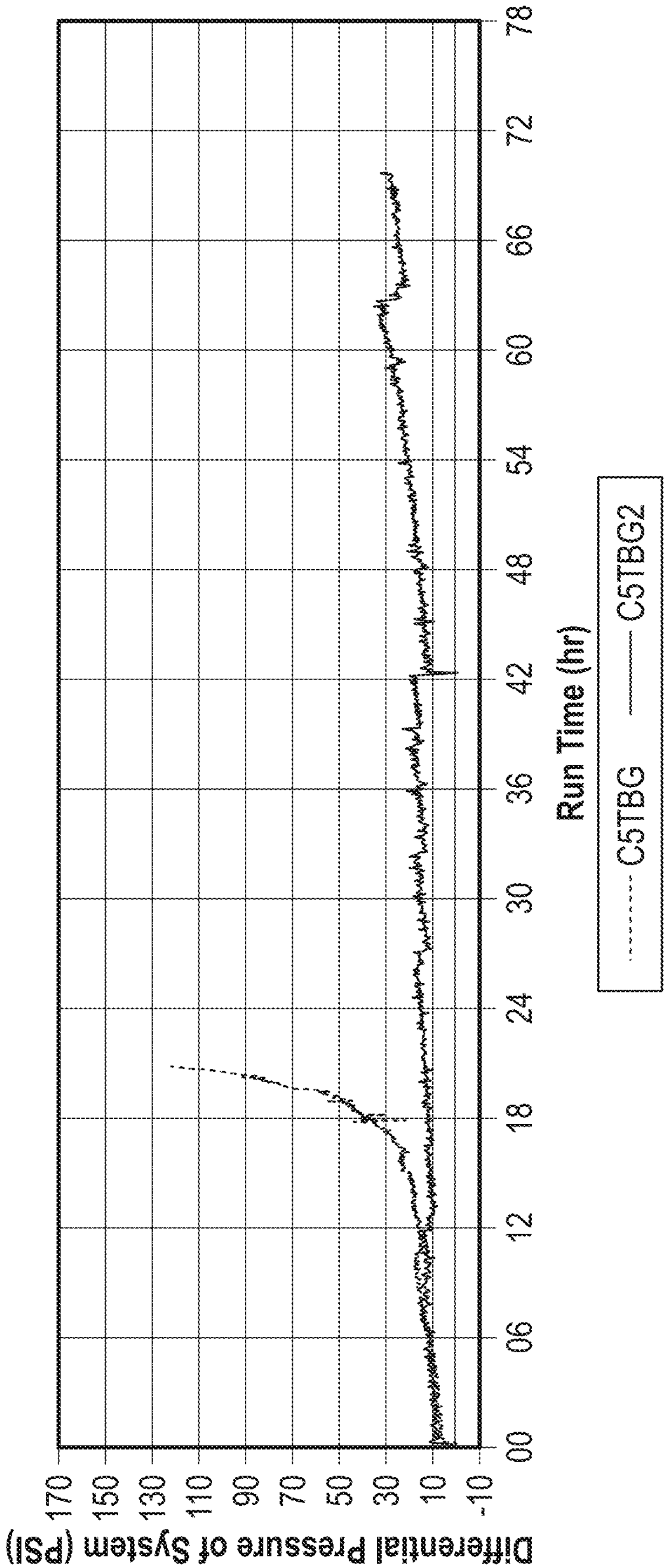
FIG. 3 depicts a graph of the effect of acid injection locations in the process depicted in FIG. 1 on the differential pressure over time relating to some embodiments.

FIG. 3 depicts the difference in foulant formation between injecting acid directly downstream from preheater 130 (i.e., directly upstream from reactor 132) and injecting acid directly downstream from reactor 132. Table 4 shows the run duration and the differential pressure of the process at the end of each test run as depicted in FIG. 3. Further, Table 4 compares the injection location and the differential pressure indicative of the amount of foulants that are formed in the process. Condition C5TBG utilized a 4:1 ratio of animal fat to brown grease as a feedstock and injected the acid directly downstream from preheater 130 of process 100. Condition C5TBG2 utilized a 4:1 ratio of animal fat to brown grease as a feedstock and injected the acid directly downstream from reactor 132. As depicted in FIG. 3, condition C5TBG reached a pressure differential of above 100 psi during the test run, indicating significant fouling. In contrast, condition C5TBG2 did not exhibit significant fouling during the test run. As described above, previous studies suggest that metal soaps would fall out of solution, deposit in the reactor, and foul the reactor if acid was added post hydrolysis of phospholipids (i.e., downstream from reactor 132). However, the results in Table 4 show decreased fouling by adding acid after hydrolyzing the phospholipids compared to adding acid before and thereby shows that adding acid after hydrolyzing the phospholipids does not cause metal soaps to deposit in the process as previously expected. Accordingly, FIG. 3 depicts the unexpected result of reducing the formation of foulants in the process by injecting the acid after the hydrolysis of the phospholipids in the contaminated feedstock.

TABLE 4

Summary for Conditions C5TBG and C5TBG2

| Condition | C5TBG | C5TBG2 |
|---|---|---|
| Feed | 80/20 AF/BG | 80/20 AF/BG |
| Acid Injection Location | Post-PH | Post-RXR |
| Run Duration (hr) | 21 | 70 |
| Differential Pressure at Shutdown (PSI) | 117 | 23 |

Injecting the acid after hydrolyzing the phospholipids may decrease the formation of foulants due to the feedstocks comprising nonhydratable phospholipids, such as phosphatidylethanolamine according to the formula:

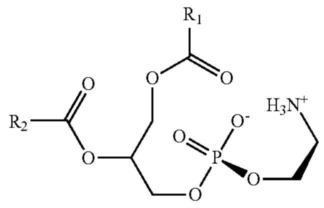

that are converted to hydratable phospholipids by the addition of acid and fall out of oil solution at typical vegetable oil refining water degumming conditions (e.g., below 100° C.). Adding acid to the mixture of feedstock and water prior to hydrolyzing the phospholipids caused the phospholipids to fall out of solution and deposit in the process units, such as the heat exchangers and reactor tubing/piping of the process. Therefore, injecting the acid after hydrolyzing the phospholipids (e.g., adding acid to mixture 118 downstream from reactor 132) keeps nonhydratable phospholipids in solution until reaching hydrolysis reaction temperatures (e.g., operating temperatures of reactor 132) and prevents the nonhydratable phospholipids from being converted to hydratable phospholipids, falling out of solution, and building a matrix of foulants with insoluble salts that are produced by the acid reaction with soaps and non-hydratable phospholipids, and depositing in the process units, such as the heat exchangers and reactor tubing/piping.

Figure 4:
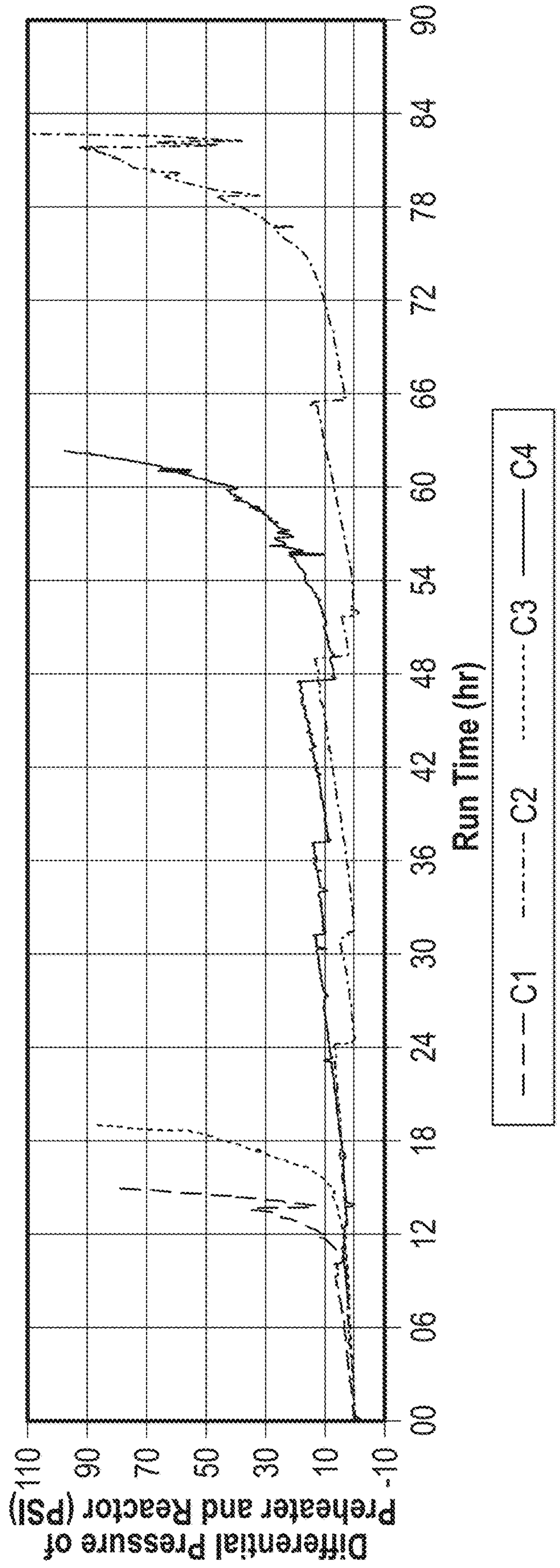
FIG. 4 depicts a graph of the effect of mixing temperatures in the process depicted in FIG. 1 on the differential pressure over time relating to some embodiments.

FIG. 4 depicts the effect that mixing temperature, the temperature at the point where oil and water are first mixed in the process, has on the formation of foulants in the process. Table 5 shows the run duration and the differential pressure of the reactor at the end of each test run as depicted in FIG. 4. Further, Table 5 compares the mixing temperature and the differential pressure that is indicative of the formation of foulants in the process. Conditions C1-C4 each utilized highly contaminated animal fat as a feedstock and injected the acid at static mixer 116 of process 100. Condition C1 had a mixing temperature of 81° C. at static mixer 116, C2 had a mixing temperature of 189° C. at static mixer 116, C3 had a mixing temperature of 99° C. at static mixer 116, and C4 had a mixing temperature of 177° C. at static mixer 116. As depicted in FIG. 4, having a greater mixing temperature increased the run time of the test before significant fouling of the process occurred. Accordingly, increasing the mixing temperature of feedstock and water decreased the formation of foulants in the process.

TABLE 5

Operating Conditions and Results for C1-C4

| Condition | C1 | C2 | C3 | C4 |
|---|---|---|---|---|
| Feed | Animal Fat | Animal Fat | Animal Fat | Animal Fat |
| Acid Injection Location | Oil Water Mix | Oil Water Mix | Oil Water Mix | Oil Water Mix |
| Oil Feed Temperature (° C.) | 60 | 149 | 93 | 149 |
| Water Feed Temperature (° C.) | 104 | 288 | 250 | 250 |
| Mixing Temperature (° C.) | 81 | 189 | 142 | 177 |
| Run Duration (hr) | 15 | 83 | 19 | 62 |
| Differential Pressure at Shutdown (PSI) | 88 | 184 | 92 | 101 |

Increasing the mixing temperature of the contaminated feedstock and the feed water may decrease the formation of foulants due to the feedstocks comprising hydratable phospholipids, such as phosphatidylcholine according to the formula:

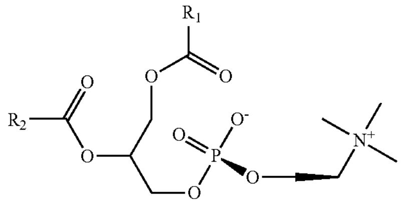

that fall out of solution at temperatures below reaction temperatures for phospholipids (e.g., below 100° C.). Therefore, increasing the mixing temperature of the mixing point of the contaminated feedstock and water (e.g., static mixer 116) keeps hydratable phospholipids in solution until reaching temperatures (e.g., operating temperatures of reactor 132) required to hydrolyze the phospholipids, preventing the hydratable phospholipids from aggregating, interacting with insoluble salts, and depositing in the process units. The preheating of the individual feedstocks also reduces the duty of the heat exchangers and heaters that are exposed to the oil water mixture, reducing the skin temperatures and heat flux of such heat exchangers and heaters, which could also contribute to the reduction in fouling. Acid addition post hydrolysis also avoids low pH water in the heat exchangers and reactor portions of the system, reducing the potential for corrosion.

Features described above as well as those claimed below may be combined in various ways without departing from the scope hereof. The following examples illustrate some possible, non-limiting combinations:

Clause 1. A process for reducing contaminants in a contaminated feedstock, the process comprising: forming a mixture by adding water to the contaminated feedstock, wherein the contaminated feedstock contains organic contaminants; feeding the mixture into a reactor at a first temperature, a first pressure, and turbulent flow; maintaining the first temperature, the first pressure, and the turbulent flow for a residence time to hydrolyze the phospholipids producing glycerides and to produce a reactor effluent, wherein the glycerides partition into an organic phase of the reactor effluent and phosphate salts partition into an aqueous phase of the reactor effluent; reducing a temperature of the reactor effluent to a second temperature via a heat exchanger; adding acid to the reactor effluent to form an acid-effluent mixture and to acidulate the metal soaps and produce fatty acids that partition into the organic phase and metal salts that partition into the aqueous phase; and separating the acid-effluent mixture into a purified feedstock product comprising the matter of the organic phase of the reactor effluent and a wastewater stream comprising the matter of the aqueous phase of the reactor effluent.

Clause 2. The process of any of the proceeding clauses, wherein the one or more contaminants comprise metal soaps.

Clause 3. The process of any of the proceeding clauses, wherein the one or more contaminants comprise phospholipids.

Clause 4. The process of any of the proceeding clauses, wherein separating the reactor effluent is performed by at least one of a gravity separator, a hydrocyclone separator, a centrifugal separator, a coalescer, a vibration assisted separator, or an electrostatic assisted separator.

Clause 5. The process of any of the proceeding clauses, wherein no acid is added to the mixture in the reactor and prior to feeding the mixture into the reactor Clause 6. The process of any of the proceeding clauses, wherein the maintaining the first temperature, the first pressure, and the turbulent flow for the residence time is to produce metal salts that partition into the aqueous phase Clause 7. The process of any of the proceeding clauses, wherein the maintaining the first temperature, the first pressure, and the turbulent flow for the residence time is to produce fatty acids that partition into the organic phase Clause 8. The process of any of the proceeding clauses, wherein the contaminated feedstock comprises at least one of oils, plant oils, seed oils, vegetable oils, deodorizer distillates, corn oils, soybean oils, algal oils, microbial oils, acid oils, biosynthetic oils, bio oils, cooking oils, greases, brown greases, yellow greases, white greases, tall oils, terpenes and other pine-related byproducts from tall oils, soapstock, phosphatide gums, glycerides, plastics, waste plastics, or pyrolysis oils from plastics.

Clause 9. The process of any of any of the proceeding clauses, wherein the acid comprises at least one of a strong acid, a weak acid, an organic acid, or an inorganic acid.

Clause 10. The process of any of the proceeding clauses, wherein the reactor is a plug-flow reactor.

Clause 11. The process any of the proceeding clauses, wherein the reactor is a tubular reactor.

Clause 11. The process of any of the proceeding clauses, wherein a linear velocity of the mixture through the reactor is between 0.5 ft/s and 20 ft/s.

Clause 12. The process of any of the proceeding clauses, wherein the first temperature of the reactor is within a range from 100° C. to 350° C.

Clause 13. The process of any of the proceeding clauses wherein the first pressure of the reactor is within a range from 500 psig to 3,000 psig.

Clause 14. The process of any of the proceeding clauses, wherein the pressure of the reactor effluent is maintained at the first pressure.

Clause 15. The process of any of the proceeding clauses, wherein the pressure of the reactor effluent is reduced to a second pressure that is less than the first pressure.

Clause 16. The process of any of the proceeding clauses, further comprising: after adding the acid to the reactor effluent to form the acid-effluent mixture, feeding the acid-effluent mixture to a static mixer and a mixing section to facilitate acidulating the metal soaps, Clause 17. The process of clause 16, wherein the static mixer and the mixing section are in-series.

Clause 18. A process for reducing contaminants in a contaminated feedstock, the process including: forming a mixture by adding water to the contaminated feedstock, wherein the contaminated feedstock includes contains organic contaminants such as phospholipids and/or metal soaps; feeding the mixture into a reactor and subjecting the mixture to an operating temperature, an operating pressure, and turbulent flow for a residence time to form a reactor effluent; maintaining the operating temperature, the operating pressure, and the turbulent flow for the residence time to hydrolyze phospholipids, the producing glycerides and to produce a reactor effluent, wherein the glycerides partition into an organic phase of the reactor effluent and phosphate salts that partition into an aqueous phase of the reactor effluent; adding acid to the reactor effluent, after hydrolyzing the phospholipids, to form an acid-effluent mixture and to acidulate the metal soaps and produce fatty acids that partition into the organic phase and metal salts that partition into the aqueous phase; and separating the acid-effluent mixture into a purified feedstock product comprising the matter of the organic phase of the reactor effluent and a wastewater stream comprising the matter of the aqueous phase of the reactor effluent.

Clause 19. The process of clause 18, wherein the operating temperature of the reactor is within a range from 100° C. to 350° C.

Clause 20. The process of any of clauses 18 through 19, wherein the operating pressure of the reactor is within a range from 500 psig to 3,000 psig.

Clause 21. The process of any of clauses 18 through 21, wherein separating the reactor effluent is performed by at least one of a gravity separator, a hydrocyclone separator, a centrifugal separator, a coalescer, a vibration assisted separator, or an electrostatic assisted separator.

Clause 22. The process of any of clauses 18 through 21, further comprising prior to forming the mixture, feeding the contaminated feedstock through one or more filters to remove contaminants having a diameter of 25 μm or greater.

Clause 23. The process of any of clauses 18 through 22, further comprising prior to forming the mixture, heating at least one of the contaminated feedstock or the water.

Clause 24. The process of any of clauses 18 through 23, wherein forming the mixture has a mixing temperature within a range of 50° C. to 350° C.

Clause 25. The process of any of clauses 18 through 24, wherein the contaminated feedstock comprises at least one of oils, plant oils, seed oils, vegetable oils, deodorizer distillates, corn oils, soybean oils, algal oils, microbial oils, acid oils, biosynthetic oils, bio oils, cooking oils, greases, brown greases, yellow greases, white greases, tall oils, terpenes and other pine-related byproducts from tall oils, soapstock, phosphatide gums, glycerides, plastics, waste plastics, or pyrolysis oils from plastic.

Clause 26. The process of any of clauses 18 through 25, wherein the one or more contaminants comprise phospholipids.

Clause 27. The process of any of clauses 18 through 26, wherein the one or more contaminants comprise metal soaps.

Clause 31. A process for reducing contaminants in a contaminated feedstock comprising contains organic contaminants such as phospholipids and/or metal soaps, the process including: heating the contaminated feedstock to a first temperature via a first heat exchanger and a feed water stream to a second temperature via a second heat exchanger; forming a mixture by feeding the contaminated feedstock and the feed water stream to a mixer; feeding the mixture into a third heat exchanger or heater and subjecting the mixture to a third temperature, a first pressure, and turbulent flow, feeding the mixture to a reactor and maintaining the third temperature, the first pressure, and the turbulent flow to produce a reactor effluent and hydrolyze the phospholipids producing glycerides and to produce a reactor effluent, wherein the glycerides partition into an organic phase of the reactor effluent and phosphate salts that partition into an aqueous phase of the reactor effluent; cooling the reactor effluent to a fourth temperature via a fourth heat exchanger; depressurizing the reactor effluent to a second pressure less than the first pressure; adding acid to the reactor effluent, after hydrolyzing the phospholipids, to form an acid-effluent mixture and to acidulate the metal soaps thereby producing fatty acids that partition into the organic phase and salts that partition into the aqueous phase; and separating the acid-effluent mixture into a clean oil product including the matter of the organic phase of the reactor effluent and a wastewater stream including the matter of the aqueous phase of the reactor effluent and the contaminants.

Clause 32. The process of clause 31, wherein the acid is added before cooling the reactor effluent to the fourth temperature, after cooling the reactor effluent to the fourth temperature, before depressurizing the reactor effluent to the second pressure, or after depressurizing the reactor effluent to the second pressure.

Clause 33. The process of any of clauses 31 or 32, wherein the third temperature of the reactor is within a range from 125° C. to 325° C., wherein the first pressure of the reactor is within a range from 500 psig to 3,000 psig.

Clause 34. The process of any of clauses 31 through 33, wherein the acid is at least one of an organic acid or an inorganic acid.

Clause 35. The process of any of clauses 31 through 34, further comprising after adding the acid to the reactor effluent to form the acid-effluent mixture, feeding the acid-effluent mixture to a static mixer to facilitate acidulating the metal soaps.

Clause 36. The process of any of clauses 31 through 35, wherein the first temperature is within a range of 50° C. to 200° C. and the second temperature is within a range of 100° C. to 300° C.

Clause 38. The process of any of clauses 31 through 37, wherein the reactor operates at a Reynolds number greater than 10,000.

Clause 39. The process of any of clauses 31 through 38, wherein the reactor operates at a Reynolds number greater than 100,000.

Clause 41. The process of any of clauses 31 through 40, wherein the reactor operates at a temperature between 200° C. and 300° C.

Clause 43. The process of any of clauses 31 through 42, wherein the reactor operates at a pressure between 500 psig and 1,500 psig.

Clause 44. The process of any of clauses 31 through 43, wherein the reactor is a tubular, turbulent-flow reactor, and a linear velocity of the mixture through the reactor is maintained between 0.5 ft/s and 20 ft/s.

Clause 45. The process of any of clauses 31 through 44, wherein the reactor is a tubular, turbulent-flow reactor, and a linear velocity of the mixture through the reactor is maintained between 1 ft/s and 10 ft/s.

Clause 46. The process of any of clauses 31 through 45, wherein the third temperature, the first pressure, and the turbulent flow are maintained in the reactor during a residence time of 2 minutes or less.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A process for reducing contaminants in a contaminated feedstock, the process comprising:

forming a mixture by adding water to the contaminated feedstock, wherein the contaminated feedstock comprises phospholipids and metal soaps;

feeding the mixture into a reactor at a first temperature, a first pressure, and turbulent flow for a residence time, wherein the turbulent flow is characterized by a Reynolds number greater than 50,000;

maintaining the first temperature, the first pressure, and the turbulent flow for the residence time to hydrolyze the phospholipids and produce glycerides that partition into an organic phase of a reactor effluent exiting the reactor, and phosphate salts that partition into an aqueous phase of the reactor effluent;

reducing a temperature of the reactor effluent to a second temperature via a heat exchanger to a second temperature at least 50° C. lower than the first temperature to generate a cooled reactor effluent;

adding acid, after hydrolysis has occurred, to the cooled reactor effluent to form an acid-effluent mixture and acidulate the metal soaps and produce metal salts that partition into the aqueous phase and fatty acids that partition into the organic phase; and separating the acid-effluent mixture into a clean oil product comprising the organic phase of the reactor effluent and a wastewater stream comprising the aqueous phase of the reactor effluent.

2. The process of claim 1, wherein the contaminated feedstock comprises at least one ingredient selected from a group consisting of oils, plant oils, seed oils, vegetable oils, deodorizer distillates, corn oils, soybean oils, algal oils, microbial oils, acid oils, biosynthetic oils, bio oils, cooking oils, greases, brown greases, yellow greases, white greases, tall oils, terpenes and other pine-related byproducts from tall oils, soapstock, lipids, fats, animal fats, tallows, lecithin, fatty acids, soaps of fatty acids, gums, phosphatide gums, glycerides, plastics, waste plastics, or plastic pyrolysis oils and mixtures thereof.

3. The process of claim 1, wherein the acid comprises at least one of a strong acid, a weak acid, an organic acid, or an inorganic acid.

4. The process of claim 1, wherein the reactor is a tubular, turbulent-flow reactor, wherein a linear velocity of the mixture through the reactor is between 3 ft/s and 20 ft/s.

5. The process of claim 1, wherein the first temperature of the reactor is within a range from 100° C. to 350° C. and the first pressure of the reactor is within a range from 500 psig to 3,000 psig.

6. The process of claim 1, wherein the second temperature is less than the first temperature, wherein the cooled reactor effluent is at a second pressure that is less than or equal to the first pressure.

7. The process of claim 1, further comprising:

after adding the acid to the reactor effluent to form the acid-effluent mixture, feeding the acid-effluent mixture to a static mixer and a mixing section to facilitate acidulating the metal soaps, wherein the static mixer and the mixing section are in-series.

8. A process for reducing contaminants in a contaminated feedstock, the process comprising:

forming a mixture by adding water to the contaminated feedstock, wherein the contaminated feedstock comprises phospholipids and metal soaps, wherein no acid or metal scavenger is introduced prior to or within a reactor;

feeding the mixture into a reactor and subjecting the mixture to an operating temperature, an operating pressure, and turbulent flow characterized by a Reynolds number greater than 50,000 for a residence time;

maintaining the operating temperature, the operating pressure, and the turbulent flow for the residence time to hydrolyze the phospholipids and produce glycerides that partition into an organic phase of a reactor effluent exiting a reactor and phosphate salts that partition into an aqueous phase of the reactor effluent;

reducing a temperature of the reactor effluent via a heat exchanger to a second temperature that is lower than the operating temperature to generate a cooled reactor effluent;

adding acid, after hydrolysis has occurred, to the reactor effluent to form an acid-effluent mixture and acidulate the metal soaps and produce metal salts that partition into the aqueous phase and fatty acids that partition into the organic phase; and separating the acid-effluent mixture into a clean oil product and a wastewater stream.

9. The process of claim 8, wherein the operating temperature of the reactor is within a range from 100° C. to 350° C., wherein the operating pressure of the reactor is within a range from 500 psig to 3,000 psig.

10. The process of claim 8, wherein separating the reactor effluent is performed by at least one of a gravity separator, a hydrocyclone separator, a centrifugal separator, a coalescer, a vibration assisted separator, or an electrostatic assisted separator.

11. The process of claim 8, further comprising prior to forming the mixture, feeding the contaminated feedstock through one or more filters to remove contaminants having a diameter of 25 μm or greater.

12. The process of claim 8, further comprising prior to forming the mixture, heating at least one of the contaminated feedstock or the water.

13. The process of claim 12, wherein forming the mixture has a mixing temperature within a range of 50° C. to 225° C.

14. The process of claim 8, wherein the contaminated feedstock comprises at least one ingredient selected from the group consisting of oils, plant oils, seed oils, vegetable oils, deodorizer distillates, corn oils, soybean oils, algal oils, microbial oils, acid oils, biosynthetic oils, bio oils, cooking oils, greases, brown greases, yellow greases, white greases, tall oils, terpenes and other pine-related byproducts from tall oils, soapstock, lipids, fats, animal fats, tallows, lecithin, fatty acids, soaps of fatty acids, gums, phosphatide gums, glycerides, plastics, waste plastics, or plastic pyrolysis oils, and mixtures thereof.

15. The process of claim 8, wherein the acid is added to the reactor effluent after exiting the reactor and prior to reducing the temperature of the reactor effluent.

* * * * *